Jan. 31, 1950     G. H. BUGENHAGEN     2,496,000
APPARATUS FOR REMOVING BLOCKS FROM MOLDING MACHINES
Filed July 23, 1945     3 Sheets-Sheet 1

INVENTOR.
George H. Bugenhagen
BY
Carroll R. Grow
ATTY

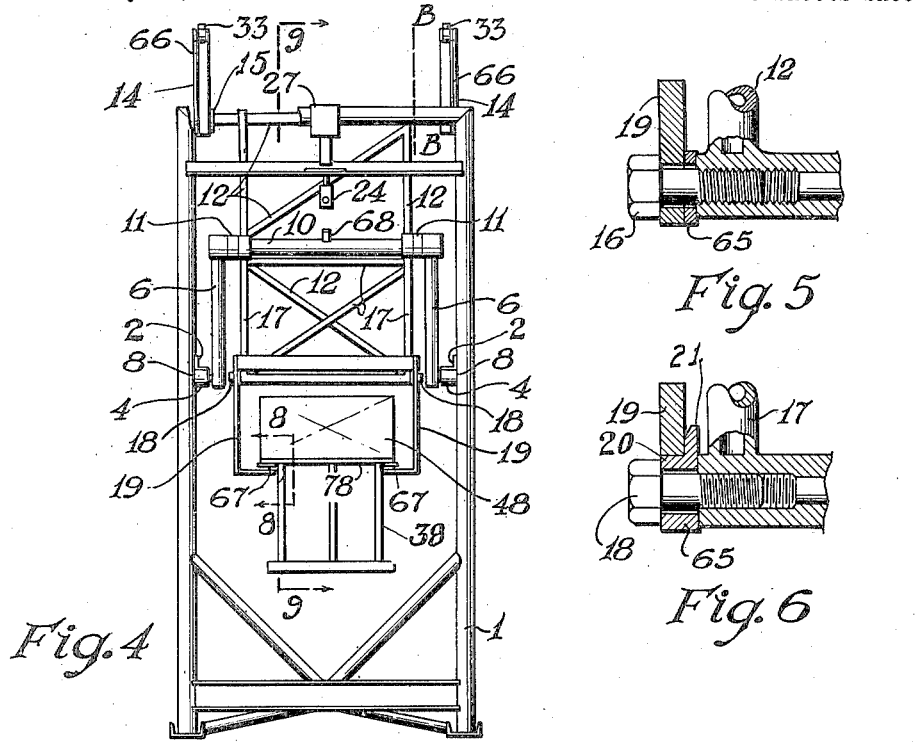
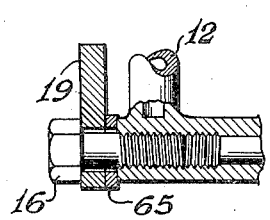
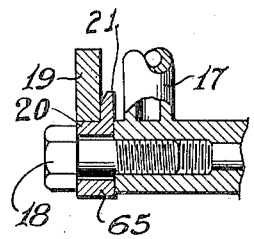
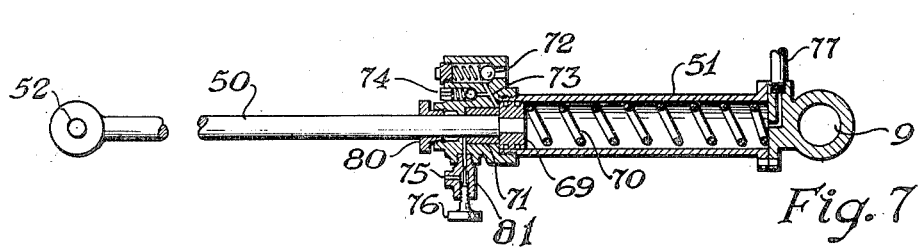
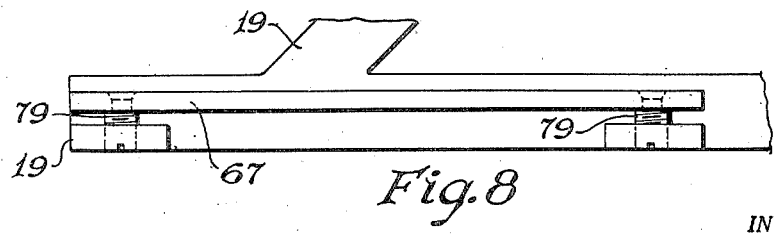

Patented Jan. 31, 1950

2,496,000

UNITED STATES PATENT OFFICE 2,496,000

APPARATUS FOR REMOVING BLOCKS FROM MOLDING MACHINES

George H. Bugenhagen, Midland, Mich.

Application July 23, 1945, Serial No. 606,639

8 Claims. (Cl. 25—1)

This invention relates to cement or cinder block equipment and more particularly has reference to an apparatus for use in connection with the removal of a freshly molded cement block, or the like, from the molding press, and the transfer of said block to a suitable means provided for carrying the block away from the vicinity of the press.

It is, therefore, one of the objects of the invention to provide a device which will pick up a newly molded block as soon as it is raised from the mold by the pins operating through the bottom of the mold, and thereafter transfer it to a suitable means, such as a conveyor, for further removal from the immediate vicinity of the press.

Another object of my invention is to provide a device for removal of blocks from a press that will allow free work space in front of the press during the period that the material is being placed in the mold and the block being formed.

Another object of my invention is to provide a device that will quickly lift the block out of the way the instant it is raised from the mold and yet handle it with such care that the green block will not be damaged.

Another object of the invention is to provide a device for removal of blocks from the press which will not damage the press or itself be damaged thereby if it should enter the press zone during the wrong part of the operation cycle.

Still another object of the invention is to provide a device that is automatically controlled by the molding press in such a manner that a freshly formed block is removed at the instant it is raised from the mold.

Other objects and advantages will be apparent when the following description of the invention is considered in connection with the accompanying drawings disclosing certain means for carrying out the invention, such disclosed means illustrating however, but several of various ways in which the principle of the invention may be used.

Fig. 4 is a front elevational view, partly in section showing a block resting on the block carrier portion of the mechanism after the press block supporting pins have lowered slightly.

Fig. 5 is an enlarged detailed sectional view of the rear portion of the block carrier showing the construction which allows the block carrier to swing upwardly at the front end.

Fig. 6 is an enlarged detailed sectional view of the front support for the block holder or carrier.

Fig. 7 is an enlarged detailed view of one variation of the telescoping connecting rod which actuates the block carrier.

Fig. 8 is an enlarged fragmentary view along lines 8—8 of Fig. 4 showing the wear plates of the block carrier together with the means for levelling and adjusting the height of said plates.

Figure 1:
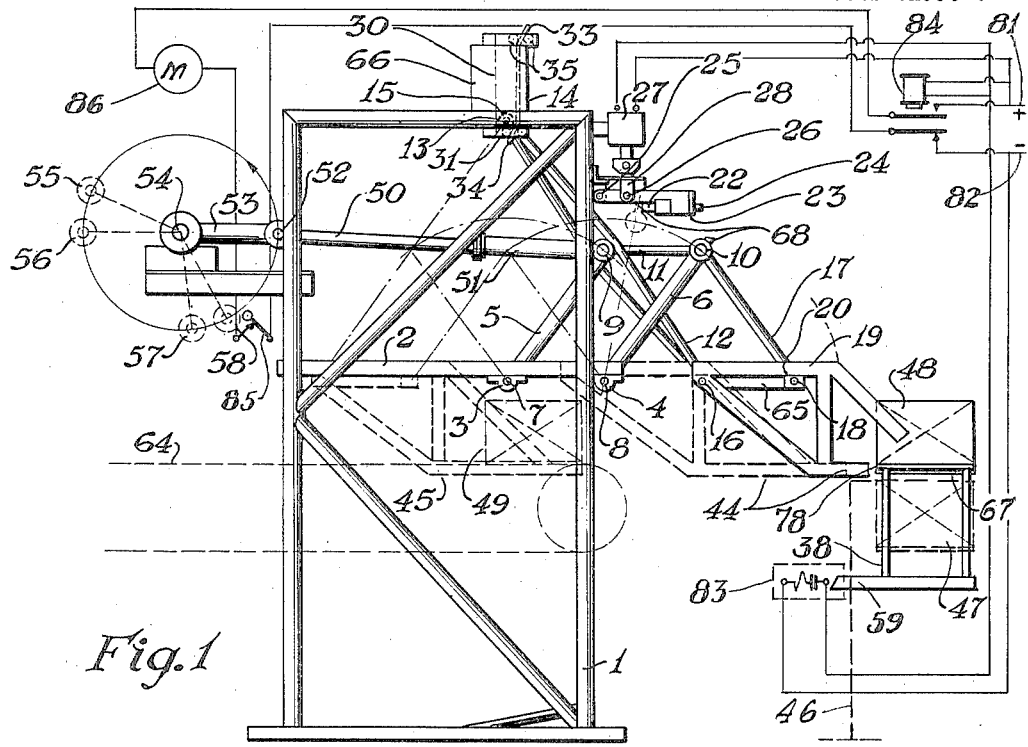
Fig. 1 is a side elevation partly in section, showing the association of the block removing device with the molding press, said device being shown in position for taking a block away from the press.

Referring for the moment to Fig. 1 suitably trussed supporting frame 1 is provided on either side with horizontal cross members 2 on each side of which are mounted bearing members 3 and 4. Each of paired parallel members 5 and 6 are pivotally or hingedly mounted at their lower ends in the bearing members 3 and 4 by means of suitably connected paired trunnions 7 and 8. The upper ends of members 5 and 6 are bored to form bearings for axial connecting members 9 and 10 which are in turn inter-connected at a point intermediate their ends by cross member 11. Member 12 consisting of paired flattened diamond shaped truss members, diagonal braces, and upper and lower horizontal cross pieces all welded or otherwise joined together to form a unit, is pivotally mounted midway its ends on cross member 9 as will be more clearly seen by reference to both Figs. 1 and 4. The upper cross piece of member 12 terminates at either end in a journal portion 13 on which rollers 15 are adapted to turn as they move up and down in member 14 provided for lowering the block onto the conveyor and to be described in more detail later. The lower cross piece of member 12 is threaded at either end to support journal bolts 16 which pivotally or hingedly support the rear end of the block holder or carrier as shown more clearly in Fig. 5. The block holder or carrier is also supported toward its front end by member 17 consisting of paired upwardly extending legs, upper and lower horizontal cross brace members, and a diagonal brace all welded or otherwise joined together to form a rectangular unit. The upwardly extending legs of member 17 terminate in bored portions which fit over and are adapted to rotate on axial member 10. The lower cross piece of member 17 is threaded at either end and serves to support journal bolts 18 as shown more clearly in Fig. 6. The lower ends of members 12 and 17 are held in spaced relation by paired connecting bars 65 which are bored at either end and are free to rotate on journal bolts 16 and 18, all as more clearly shown in the more detailed views of Figs. 5 and 6. As seen therein the forward end of connecting bar 65 terminates in a lug portion 20 having an upwardly projecting lip 21 which serves as a seat and a guide respectively for the block holder proper indicated generally by numeral 19. The block holder or carrier 19 as shown in Figs. 1 and 4 consists of a suitably braced frame open at the front and bottom and adapted to accommodate cement block 48 which rests on the usual supporting plate 78. The block and supporting plate 78 rest on adjustable wear plates 67 mounted on inwardly projecting arms of member 19 located front and rear on either side of the carrier frame. The wear plates 67 may be conveniently adjusted and levelled by means of adjusting screws 79 as shown in the fragmentary view of Fig. 8. As shown, the block holder is adapted to swing upwardly at the front end by reason of its rear mounting on journal member 16, while its limit of downward travel is controlled by lug 20 on cross brace 65. The position of the carrier member 19 during several stages of an operative cycle is shown in broken lines and indicated by numerals 44 and 45. Similarly the position of the cement block during various stages of a cycle is shown somewhat diagrammatically as in the press 46 at 47, on the block holder 19 supported both by the holder or carrier and press pins 38, and on the conveyor belt 64 at 49.

Figure 2:
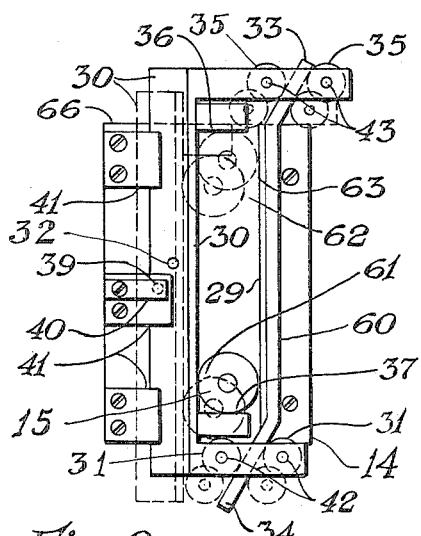
Fig. 2 is an enlarged detailed view of that portion of the device which functions to lower the block onto the conveyor, with the position of the various parts during different parts of the cycle being indicated by broken lines.
Figure 3:
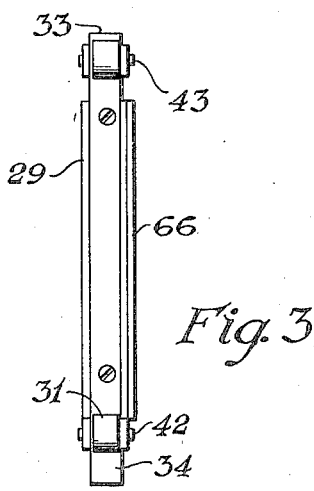
Fig. 3 is a side view of that portion of the device illustrated in Figure 2.

In the modification shown in Fig. 1 a catch 68 on axial member 10 associated with suitable latching mechanism provides a means whereby movement of the carrier can be arrested for release at a suitable time. The catch 68 engages a latch 22 adapted for forward horizontal movement in the latch housing 23 while being guided in the housing by the guide pin 24. The latch may suitably be urged outwardly by a spring (not shown) in the latch housing whereby the shock of engagement of catch 68 and latch 22 will be gently absorbed. The latch housing 23 is hingedly mounted on frame 1 at 25, and is connected to a solenoid 27 of conventional design separately mounted on frame 1, through arm 28 at 26. Suitably energizing the solenoid thus lifts the latch 22 from the catch 68 in a manner to be described more fully later on in the specification. In Figs. 2 and 3 the mechanism 14 provided for lowering the block onto conveyor belt 64 is shown in enlarged detail. The mechanism consists of two identical units 14 attached to frame 1 as more clearly shown in Fig. 4. A backing plate 66 rigidly attached to frame 1 forms a base to which guide plate 29 is fixedly attached extending vertically along the base 66 and at right angles thereto. The guide plate 29 is backed up by a second plate 60 having an outwardly sloping upper end 33 and an inwardly sloping lower end 34. A second plate member 30 is slidably mounted on the base 66 and is held thereto by means of three suitable clamping plates 41. The clamping plates 41 are so designed to allow the plate 30 to slide thereunder both laterally and vertically. The middle plate 41 is provided with a conventional ball latch mechanism 39 retained by cover plate 40. The ball latch 39 is adapted to register with a suitably positioned port 32 in member 30 as well as a port directly under the ball latch 39 when the parts are in the position shown in full lines in Fig. 2, whereby to releasably hold the plate 30 at a desired position during certain phases of the cycle of operation. Either end of plate member 30 is provided with a U-shaped bar portion extending over the inwardly and outwardly sloping ends 33 and 34 of plate 60. Two identical rollers 31 are rotatably mounted on pins 42 in the U-shaped bar section of member 30 in such a manner as to straddle the sloping end 33 of plate 60. Similarly two identical rollers 35 are mounted on pins 43 in such a manner as to straddle the sloping end 34 of plate 60. Thus the sloping ends 33 and 34 serve as tracks for rollers 31 and 35 and since the latter are fixed to member 30 its movement is controlled by the movement of the rollers on the sloping ends 33 and 34 of plate 60. At the same time the faces of plates 29 and 30 serve to form a track for roller 15. Lugs 36 and 37 are fixed to plate 30 at either end in such a manner as to be acted upon by roller 15 whereby the plate member 30 is raised or lowered at a suitable time in the operation cycle. The roller 15 is indicated at the various positions it assumes by numerals 61, 62 and 63.

Referring again to Fig. 1 it will be seen that the carrier mechanism is actuated by means of a connecting rod 50 provided with a telescoping section 51. A crank pin 52 links the connecting rod 50 with crank arm 53. The crank arm 53 is mounted on driven shaft 54. The position of the crank arm 53 at various times during the operative cycle is shown in broken lines and indicated by numerals 55, 56, 57 and 58.

An electrical circuit is provided in connection with the operation of the device, and as shown in Fig. 1, the positive and negative leads 81 and 82 are connected through switch 83 with the solenoid 27. The switch 83 is adapted to close only momentarily as the block 48 is lifted from the press 46, and press lift arm 59 trips switch 83. The electrical leads 81 and 82 are also connected through relay 84 and switch 85 with motor 86. The motor 86 is associated with drive shaft 54 in any conventional operative manner (not shown). The switch 85 stays in a normally closed position and only remains open during the time crank pin 52 contacts it at 58.

One modification of the telescoping connecting rod 50 is shown in the enlarged detail of Fig. 7. As seen therein connecting rod 50 is provided with a piston 69 which is adapted to operate in cylinder 51 through packing gland 80. The piston is shown operating against air pressure from a suitable source 77, as well as against spring 70, although it is to be understood that it is within the scope of this invention to operate with either air pressure alone or with the spring alone. A conventional ball check valve 72 admits air into the cylinder through port or duct 73 during the compression stroke while a second ball check valve 74 is positioned in conjunction with the port 73 for allowing air to escape from the cylinder 51 during the expansion stroke. As a means of absorbing the shock occurring during the expansion stroke the hub of piston 69 acts as a secondary piston in chamber 71 at the tail end of the expansion stroke and seals off port 73. An air cushion is thus formed in chamber 71 and the air compressed in chamber 71 escapes through port 75 in valve 81 at a rate controlled by valve member 76. The function of telescoping connecting rod is two-fold. First it prevents damage to the carrier or block holder should the latter enter the press zone during the wrong portion of the cycle by allowing the holder to be pushed out of the way by virtue of the compressible feature of the connecting rod. Second, it provides a means whereby the carrier may be caused to quickly enter into position for receiving the block from the press lift pins.

Figure 9:
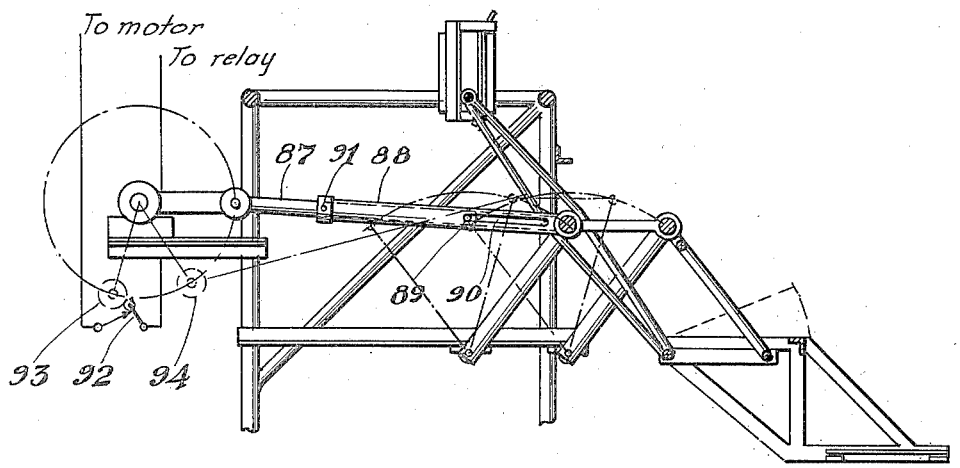
Fig. 9 is a fragmentary side elevation along lines 9—9 of Fig. 4 showing a variation of a portion of the device of Fig. 1.

Fig. 9 shows a modification of the device of Fig. 1 in that the latch mechanism including the latch 68 and the solenoid assembly have been dispensed with. Additionally the telescoping connecting rod has been modified. Connecting rod 87 extends into the housing 88 and is provided with a pin 89 adapted to slide in slotted port 90 in the housing 88. A shear pin 91 operatively connects the housing 88 with the connecting rod 87 in such a manner that should the block carrier enter the press zone at the wrong portion of the cycle the pin 91 will shear and allow the connecting rod to telescope in the housing without causing damage to the carrier generally. In the modification of Fig. 9 the switch 92 will be positioned so that the crank pin 52 will contact it at 93 to break the circuit causing the crank arm 53 to stop at 94 rather than in the horizontal position of Fig. 1.

Figure 10:
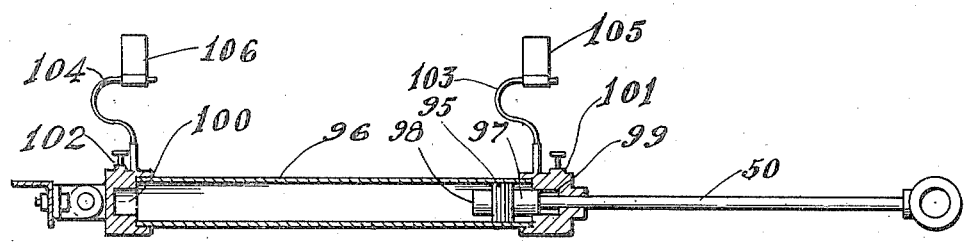
Fig. 10 is an enlarged detailed sectional view of a variation of the telescoping connecting rod feature.

Referring to Fig. 10 the telescoping connecting rod 50 is provided with a piston 95 which operates in housing 96. In this instance the piston 95 is provided with hub portions 97 and 98 adapted to operate in air cushion chambers 99 and 100 respectively; the latter being associated with adjustable air escape valves 101 and 102 in a manner similar to that described in connection with valve 81, Fig. 7. The piston hubs 97 and 98 are made suitably long so that air entering the housing 96 from lines 103 and 104 will operate on the piston to cause movement in the desired direction depending on which of the electrically operated air valves 105 and 106 are open. It will be appreciated that the electrical circuit of Fig. 1 may be readily altered in conventional manner so that at the time the crank arm 53 is in a horizontal position solenoid operated air valve 105 will be in an open position and valve 106 in a closed and vented position with the connecting rod 50 thus telescoped within the housing 96. At the time the circuit is completed through switch 83 by the bar lift 59 the solenoid of valve 106 may be energized causing air valve 106 to open while valve 105 is closed and vented. In this manner the block carrier will be driven forward at the time the press lift raises a block from the mold.

The operation of the device depicted in Fig. 1 to remove a cement block from the press and transfer it to the conveyor belt will be best understood from the following description. As the press 40 completed the operation of molding the block, pins 38 raise through the false bottom of the press and push the block 48 upwardly on supporting plate or pallet 78. As the block clears the press, the press bar 59 closes switch 83 momentarily. This completes the electrical circuit through the solenoid latching mechanism 27 which energizes the solenoid coil causing it to lift the latch assembly from catch 68. The block holder 19 then darts forward from its indicated position 44 to a new position under the block 48 and supporting plate 78 due to the action of the compression spring and/or air on the connecting rod piston as described in connection with Fig. 7. At the same instant closing switch 83 causes the circuit through the relay coil of relay 84 to be completed closing the relay and completing the circuit to the motor 86. Although the solenoid coil is only energized momentarily by the closing of switch 83, it will be apparent that the relay coil once energized by closing the switch 83 remains energized and hence the relay also remains closed until the current in the motor leg of the circuit is broken by switch 85 opening. The shaft 54 suitably connected to the motor starts crank arm 53 to move in a circular path in the direction of the arrow. By the time the crank arm 53 is under motion the press pins 38 have receded into the press mold allowing the block and supporting plate to rest on the carrier wear plates 67 of block holder or carrier 19. As the crank arm 53 moves in its circular path the carrier and block move away from the press. As the carrier and block clear the front of the press the block supporting pins will have dropped to the bottom of the press mold and the operator will insert another pallet or supporting plate 78 into the mold and the press will proceed to mold another block. As the crank arm 53 reaches a position such that members 5 and 6 are in a vertical position rollers 15 will have travelled upward in their track in guide members 14 to a point where lugs 36 have been engaged and forced upward. The ball latch 39 will have disengaged port 32 and engaged the other port (not shown) and the member 30 will be held in the position shown in full lines in Fig. 2. As the crank arm 53 continues in its circular path, point 55 is reached and the rollers 15 will then have returned to a point shown in full lines in Fig. 2 while the block holder will have the block suspended just off the conveyor belt. In moving from point 55 to 56 crank arm 53 will cause roller 15 to engage lug 37 which in turn causes the roller 15 and member 30 to move diagonally downward to a position shown in broken lines in Fig. 2 to a point where the ball latch 39 is in registry with port 32; the diagonal downward movement being controlled by the movement of rollers 31 and 35 on the sloping ends 33 and 34 of plate 60. The net effect of this downward diagonal movement is to lower the green block and the supporting plate gently onto the moving conveyor belt 64 which promptly moves it away from the carrier 19. The block supporting plates 67 actually drop below the level of the belt 64 so that the block is wholly supported by the belt 64. By the time the block has been moved out of the way by the conveyor belt the crank arm 53 will have progressed to a point where the arms 5 and 6 and carrier member 12 reach a vertical position causing the rollers 15 to again engage lug 36 thus moving members 30 to the position shown in full lines in Fig. 2. The movement of crank arm 53 continues to point 58 at which point crank pin 52 trips switch 85 causing the electrical circuit to the motor to be broken and this in turn breaks the circuit to the relay coil. At the time the crank arm 53 reaches position 58 the catch 68 will engage the latching mechanism 22 and compression of the telescoping section of the connecting rod will occur as the crank arm returns to a horizontal position. If desired or necessary, a suitable brake may be provided to stop the crank arm at the horizontal position although generally the switch 85 may be suitably located to allow the inertia of the mechanism to bring the crank arm to the desired position. At about this time the press will have completed the operation of molding another block and as it is lifted from the press mold the removal cycle will be repeated.

It will be apparent that the combination of the elements described is particularly advantageous in that, should the carrier be over the press during the time the green block is being lifted from the press mold, the block holder or carrier 19 will merely swing upwardly at the front end about journal bolts 16 without harm to either carrier or press. Similarly, if the carrier should happen to enter the press zone while the block mix delivery device is over the mold or entering the mold zone, the connecting rod will be merely compressed without damage to either the carrier or the press appurtenances.

The operation of the modification shown in Fig. 9 is very similar to that of the device of Fig. 1 with the following exceptions. In this case, the normal position of rest for the crank arm 53 will be at 94, while the cutout switch for the motor will be located at 93 so that the carrier will stop at a position outside the press zone. It will be evident that the operation cycle will consume slightly more time in view of the fact that the action of the crank arm in urging the carrier under the block will be considerably slower than the action of a spring or compressed air actuated connecting rod. Further, the crank arm will have to travel a greater distance during the portion of the cycle directly concerned with the removal of the block from the press. Additionally, the use of a shear pin on the telescoping connecting rod is not as advantageous as the spring or air actuated cylinders. Thus the use of a spring or air actuated connecting rod is clearly the preferred form. It will be appreciated that while the invention has been described utilizing pivot arms 5 and 6 to support cross members 9 and 10 and the block holder generally these members could be readily provided with suitable rollers and tracks without in any manner departing from the scope of the invention.

I claim:

1. In a block press apparatus of the class wherein a block is ejected from a press by a block lift mechanism, the combination which includes a block carrier adapted to receive a block from the block lift mechanism, said block carrier being mounted to move upwardly when suitably urged, supporting arms adapted to move horizontally and vertically pivotally attached to the carrier, an actuating arm associated with said supporting arms adapted to move the carrier away from the press and over a receiving member, said actuating member being adapted to telescope and shorten upon contact of the carrier and the press, and means associated with the carrier adapted to move the carrier downwardly as it assumes a position over the receiving member to transfer the block to the receiving member.

2. In a block press apparatus of the class wherein a block is ejected from a press by a block lift mechanism; the combination of a block holder adapted to be actuated to receive the block from the block lift mechanism, said block holder being hingedly mounted at the back end for upward movement at its forward end; supporting arms pivotally attached to the block holder; a compressible connecting member associated with the block holder and the supporting arms adapted to be actuated to move the block holder away from the press to a position over a conveyor; and means including rollers adapted for guided movement on an inclined track associated with the block holder supporting arms, the block holder, and the connecting member adapted to move the block holder downwardly when it is positioned over the conveyor.

3. In a block press apparatus of the class wherein a block is ejected from a block press by a block lift mechanism; the combination which includes a block receiving carrier open at the front and bottom adapted to move forward under the block on the block lift mechanism, said block receiving carrier being suitably mounted about its rear end for upward movement at its forward end; movable supporting arms for said block receiving carrier; a compressible connecting rod adapted to move the block receiving carrier away from the press to a position over a conveyor and from a position over the conveyor toward the press; means associated with the block receiving carrier adapted to be actuated by the compressible connecting rod to move the block receiving carrier downwardly when it is positioned over the conveyor to deposit the block on the conveyor; latching means adapted to arrest forward movement of the block receiving carrier for compression of the compressible connecting rod under a force which tends to urge said compressible connecting rod forward; and means adapted to disengage the latching means when a block is lifted from the press mold.

4. In a block press apparatus of the class wherein a block and its supporting plate are ejected from the press mold by lift pins; the combination which includes a block receiving carrier adapted to move forward and receive the block and plate from the lift pins, said block receiving member being hingedly mounted at its rear end to allow generally upward movement at the front end; adjustable wear plates mounted on the block carrier upon which the supporting plate and block are adapted to rest; supporting arms for the block receiving carrier adapted to move both horizontally and vertically; a compressible connecting rod connected to the block receiving carrier through the movable supporting arms adapted to move the block receiving carrier and block to a position over a conveyor; means associated with the block receiving carrier, the compressible connecting rod, and the arms supporting the carrier adapted to urge the block carrier downwardly to deposit the block and supporting plate on the conveyor when the block carrier is positioned over the conveyor; latching means adapted to arrest movement of one end of the compressible connecting rod while the other end is caused to move forward to compress said member; and means adapted to disengage the latching means as a block is lifted from the press mold, said means also being associated with the connecting rod for actuation of the same.

5. In a block press apparatus of the class wherein a block and its supporting plate are ejected from the press mold by lift pins; the combination which includes a block receiving carrier open at the front and bottom adapted to move forward and slide under the block supporting plate, said block receiving carrier being rotatably mounted about its rear end for upward movement at the front end and with a stop lug adapted to limit the downward travel of the front end of the block receiving carrier; supporting members for said block receiving carrier adapted to move horizontally and vertically; a connecting rod adapted to telescope when suitably urged associated with the movable supporting members adapted to move the block and block carrier rearwardly to position over a conveyor; means associated with the block receiving carrier and the connecting rod adapted to be actuated by the latter to lower the block carrier when the latter is positioned over the conveyor so as to deposit the block and supporting plate thereon; and electrical circuit means adapted to actuate the connecting rod to cause the block receiving carrier to slide under the block when the latter is lifted from the press mold, said electrical circuit means also including means to stop the connecting rod at a point such that the block carrier is prevented from moving into the area occupied by the block during the time the block is being molded and lifted from the mold by the block lift mechanism.

6. In a block press apparatus of the class wherein a block is ejected from a press by block lift mechanism and transferred to a conveyor; the combination which includes a block holder adapted to move forward under the block lift mechanism and receive a block therefrom said block holder being hingedly mounted for upward movement about its front end; movable supports for said block holder; a compressible connecting rod adapted to move the block holder toward and away from the press, said compressible portion of the connecting rod consisting of an air cylinder having a double acting piston mounted therein; control means associated with the compressible connecting rod adapted to compress the connecting rod at a time prior to the ejection of the block from the press and to extend the connecting rod when the block is raised from the press; and means adapted to urge the block holder downwardly to deposit the block on the conveyor when the block holder reaches a position over the conveyor.

7. In a block press apparatus of the class wherein a block is ejected from a block press by block lift mechanism; the combination which includes a block holder adapted to move forward under the block lift mechanism and receive the block therefrom, said block holder being hingedly mounted for upward movement about its front end; movable supporting arms for said block holder; a telescoping connecting rod adapted to move the block holder toward and away from the block press; said connecting rod being normally restrained from telescoping by a shear pin; means to actuate the connecting rod with a control associated therewith adapted to prevent the block holder from entering the block ejection area of the press prior to the ejection of the block and to urge the block holder under the block as it is lifted by the press lift mechanism; and means adapted to urge the block holder downwardly when the latter is positioned over a conveyor so as to deposit the block on the conveyor.

8. In a block press apparatus of the class wherein a block is ejected from a block press by block lift mechanism; the combination which includes a block holder adapted to allow the block to enter at the front and leave at the rear end, said block holder being hingedly mounted for upward movement about its front end; movable supports for said block holder; a telescoping connecting rod adapted to move the block holder from the block press to a conveyor; said connecting rod being normally restrained from telescoping by a spring; means to actuate the connecting rod with a control associated therewith adapted to prevent the block holder from entering the block ejection area of the press prior to the ejection of the block by the press and to urge the block holder under the block as it is ejected by the press; and means adapted to urge the block holder downwardly when the latter is positioned over the conveyor.

GEORGE H. BUGENHAGEN.

REFERENCES CITED

The following references are of record in the file of this patent:

UNITED STATES PATENTS

| Number | Name | Date |
| --- | --- | --- |
| 1,480,868 | Stripe | Jan. 15, 1924 |
| 1,733,547 | Lorenz | Oct. 29, 1929 |
| 1,766,573 | Westin | June 24, 1930 |
| 1,959,512 | Wall et al. | May 22, 1934 |
| 1,974,837 | Shillinger et al. | Sept. 25, 1934 |
| 2,176,251 | Duhan | Oct. 17, 1939 |
| 2,193,879 | Muenzer | Mar. 19, 1940 |
| 2,322,294 | Heyman | June 22, 1943 |